(12) United States Patent
Wetmore

(10) Patent No.: US 9,635,630 B2
(45) Date of Patent: *Apr. 25, 2017

(54) METHOD AND APPARATUS FOR SYNCHRONIZING MULTIPLE TRANSMITTERS

(71) Applicant: Fox Digital Enterprises, Inc., Los Angeles, CA (US)

(72) Inventor: Robert E. Wetmore, Manhattan Beach, CA (US)

(73) Assignee: FOX DIGITAL ENTERPRISES, INC., Los Angeles, CA (US)

(*) Notice: Subject to any disclaimer, the term of this patent is extended or adjusted under 35 U.S.C. 154(b) by 102 days.

This patent is subject to a terminal disclaimer.

(21) Appl. No.: 14/606,791

(22) Filed: Jan. 27, 2015

(65) Prior Publication Data

US 2015/0139221 A1 May 21, 2015

Related U.S. Application Data

(63) Continuation of application No. 13/078,698, filed on Apr. 1, 2011, now Pat. No. 8,942,742, which is a continuation-in-part of application No. 12/947,604, filed on Nov. 16, 2010, now Pat. No. 9,014,732.

(51) Int. Cl.
*H04W 56/00* (2009.01)
*H04B 7/06* (2006.01)

(52) U.S. Cl.
CPC ........ *H04W 56/002* (2013.01); *H04B 7/0671* (2013.01); *H04B 7/0673* (2013.01); *H04W 56/0015* (2013.01); *H04W 56/0035* (2013.01)

(58) Field of Classification Search
CPC .............................. H04W 84/18; H04W 84/12
See application file for complete search history.

(56) References Cited

U.S. PATENT DOCUMENTS 4,409,684 A 10/1983 Pooch et al.
5,239,672 A 8/1993 Kurby et al.
5,729,825 A 3/1998 Kostreski et al.
(Continued)

FOREIGN PATENT DOCUMENTS

EP 0801502 10/1997
EP 1111935 6/2001
(Continued)

OTHER PUBLICATIONS

ATSC Standard for Transmitter Synchronization (Doc. A/110:2011, Apr. 8, 2011).
(Continued)

*Primary Examiner* — Andrew Lai
*Assistant Examiner* — Zhiren Qin
(74) *Attorney, Agent, or Firm* — Gates & Cooper LLP

(57) ABSTRACT

A method and apparatus for synchronizing multiple transmitters is disclosed. A global time reference is used to synchronize the arrival of data from a plurality of secondary transmitters in a receiver station. In one embodiment, the global time reference is provided by a GPS satellite, and may also be used to synchronize the carriers of the signals received at the receiver station from each of the plurality of transmitters. In one embodiment, a pilot signal used for ATSC applications is added by the secondary transmitters.

24 Claims, 16 Drawing Sheets

(56) References Cited

U.S. PATENT DOCUMENTS

| | | |
|---|---|---|
| 7,103,374 B2 | 9/2006 | Yla-Jaaski et al. |
| 7,110,048 B2 | 9/2006 | Weiss |
| 7,336,646 B2 | 2/2008 | Muller |
| 7,667,780 B2 | 2/2010 | Weiss |
| 7,924,347 B2 | 4/2011 | Weiss |
| 8,792,473 B2 | 7/2014 | Bekiares et al. |
| 2007/0079224 A1 | 4/2007 | Limberg |
| 2008/0112440 A1* | 5/2008 | Bedekar ............ H04W 56/0045 370/519 |
| 2009/0225910 A1* | 9/2009 | Suzuki ................ H04L 27/2605 375/343 |
| 2010/0166042 A1 | 7/2010 | Lannuzzelli et al. |
| 2010/0195760 A1* | 8/2010 | Weiss ..................... H04N 5/38 375/295 |

FOREIGN PATENT DOCUMENTS

| | | |
|---|---|---|
| WO | 9407314 | 3/1994 |
| WO | 0076113 | 12/2000 |

OTHER PUBLICATIONS

ATSC Digital Television Standard: Part 1—Digital Television System (Doc. A/53 Part 1:2009, Aug. 7, 2009).

ATSC Digital Television Standard: Part 2—RF/Transmission System Characteristics (Doc. A/53 Part 2:2007, Jan. 3, 2007).

ATSC Digital Television Standard: Part 3—Service Multiplex and Transport Subsystem Characteristics (Doc. A/53 Part 3:2009, Aug. 7, 2009).

ATSC Digital Television Standard: Part 4—MPEG-2 Video System Characteristics (Doc. A/53 Part 4:2009, Aug. 7, 2009).

ATSC Digital Television Standard: Part 5—AC-3 Audio System Characteristics (Doc. A/53 Part 5:2010, Jul. 6, 2010).

ATSC Digital Television Standard: Part 6—Enchanced AC-3 Audio System Characteristics (Doc. A/53 Part 6:2010, Jul. 6, 2010).

Chaskar, H. M. et al., "Statistical Multiplexing and QoS Provisioning for Real-Time Traffic on Wireless Downlinks", IEEE Journal on Selected Areas in Communications, vol. 19, No. 2, Feb. 2001, pp. 347-354.

Coffey, G. A., "Video over ATM Networks", <http://www.cis.ohio-state.edu/-jain/cis788-97/video_over_atm/index.htm Aug. 17, 1997>.

DTV Report on COFDM and 8-VSB Performance, Office of Engineering and Technology Sep. 30, 1999, OET Report FCC/OET 99-2.

Enensys Technologies: "Technical Overview of Single Frequency Network". <www.enensys.com>.

PCT International Search Report and Written Opinion dated Apr. 24, 2012, International Application PCT/US11/61073.

* cited by examiner

METHOD AND APPARATUS FOR SYNCHRONIZING MULTIPLE TRANSMITTERS

CROSS-REFERENCE TO RELATED APPLICATIONS

This application is a continuation of U.S. patent application Ser. No. 13/078,698, entitled "METHOD AND APPARATUS FOR SYNCHRONIZING MULTIPLE TRANSMITTERS," by Robert E. Wetmore, filed Apr. 1, 2011, now issued as U.S. Pat. No. 8,942,742, which is a continuation in part of U.S. patent application Ser. No. 12/947,604, entitled "METHOD AND APPARATUS FOR SYNCHRONIZING MULTIPLE TRANSMITTERS," by Robert E. Wetmore, filed Nov. 16, 2010, both of which applications are hereby incorporated by reference herein.

BACKGROUND OF THE INVENTION

1. Field of the Invention

The present invention relates to systems and methods for wireless transmission, and in particular to a system and method for synchronizing transmissions from multiple transmitters.

2. Description of the Related Art

Terrestrial transmission systems have been used for many years to transmit television signals to television sets and other home based receivers. It is desirable for the range and scope of such television transmissions to be well controlled to assure that the television signals are receivable by the maximum number of appropriate viewers. At the same time, such transmissions must prevent interference with other television transmissions.

One technique for extending the range of television transmissions is to use multiple transmitters, each disposed in a different location. In some cases, such transmitters are used to provide coverage in areas where a primary transmitter cannot reach. For example, in Los Angeles, many transmitters are placed on Mt. Wilson, where they have a line-of-sight to much of the Los Angeles Basin. However, even when optimally placed, such primary transmitters often cannot provide a strong enough signal to areas that are shadowed by natural features such as mountains and/or blocked or reflected by with by man-made features such as buildings and other transmitters. In such cases, service may nonetheless be provided by use of additional transmitters (known as gap fillers or boosters) disposed proximate the areas unserviced by the primary transmitter. Repeaters may also be used to extend the reach of the primary transmitter beyond primary reception range.

In addition to merely covering areas otherwise unserviced by the primary transmitter, an array of transmitters may be used to strengthen the received signal in some areas, while weakening the signal in others.

One difficulty in the use of such auxiliary transmitters is that the signals that they transmit may interfere with the signals broadcast by the primary transmitter or other transmitters. These problems can be minimized by advantageous placement of other transmitters, by orienting the transmitter antennas in an optimal direction, and by choosing antenna patterns such that coverage is maximized while interference is minimized. However, even using such techniques, the coverage area of the transmitters may overlap, raising the specter of interference in those areas.

FIG. 1 is a diagram of a prior art transmission system 100. The transmission system 100 includes a master transmitter 102 that is communicatively coupled a plurality of secondary transmitters 104A-104C (hereinafter alternatively referred to as transmitter(s) 104). The master transmitter 102 may be communicatively coupled with transmitters 104 via a wireless link (including radio frequency (RF), intermediate frequency (IF), microwave, optical frequencies) or a wired link. Wireless communications may be via terrestrial transmission, airborne transmission or by satellite. Further, communications with one of the transmitters 104 may be wireless, while communications with another one of the transmitters 104 may be wired.

The transmitters 106 receive a signal comprising information such as a media program, advertisements from the master transmitter 102 and retransmit the received signal to receiver stations 108A-108D (hereby alternatively referred to as receiver station(s) 108). The receiver stations 108 may be embodied by any device capable of receiving and the signals from the secondary transmitters 104, and processing them for display, including for example television receivers, set-top boxes, cellphones, personal computers or laptop computers. Each of the transmitters 104 transmits provides a transmitted signal 112A-112C (hereinafter alternatively referred to as transmitted signal(s) 112) in coverage areas 106A-106C (hereinafter alternatively referred to as coverage area(s) 106).

The true coverage area of the transmitters 104 is not as simple as depicted. The actual coverage area will depend on time varying characteristics such as weather, the performance characteristics of the receiver stations 108, and external blockage factors such as opaque objects 114 preventing signal passage or reflective objects that direct signals where they are not desired.

For example, during periods of extreme weather, coverage areas 106 may be substantially reduced in size, and buildings may reflect signal to undesired areas. Further, a receiver station having improved hardware or software may be capable of receiving a signal from a transmitter in situations where a standard receiver station cannot. Coverage areas 106 include overlapping coverage areas 110A-110B (hereinafter alternatively referred to as overlapping coverage area(s) 110. Receiver stations 108 in overlapping areas (for example, receiver station 108D) may have difficulty receiving a signal because signal provided by transmitter 104A is interfered with by the signal from transmitter 104B. This problem is discussed in further detail in U.S. Pat. No. 7,110,048, issued Sep. 9, 2006 to Weiss, which is incorporated by reference herein.

While the '048 patent proposes a solution to the interference problem, it does not disclose a system that ensures that the data received from a first repeater is completely identical to data received from the main transmitter. If the data received from a first repeater is not identical to that received from the main transmitter regardless of the time delay, the non-identical data will cause mutual interference.

Additionally because the described processing adds potentially different time delays to each of the signals from each transmitter, the '048 patent makes no provision for assuring that the data transmitted by each transmitter is received within the ability of a receiver to equalize out the resultant intersymbol interference.

If the received data is not completely identical, it will seem to a receiver that picks-up both the main and the repeated signal simultaneously as both interference and as an echo. While some of the receivers can equalize out the effects of echoes, they cannot correct for interference. Further, at some point, the delays may be large enough to exceed the capacity of the equalizers to detect and cancel the echoes. Accordingly, the system disclosed in the '048 patent will result in transmissions that cannot be received due to interference or excessively long echoes.

Interference can be from many sources, including multipath and other problems that are caused by the signals 112A and 112B arriving at the receiver at different times. One problem is that the carrier of the first signal 112A will not be in phase with the carrier of the second signal 112B, compromising the demodulation of the signal at the receiver station 108. Another problem is that after demodulation, the data itself from the different transmitters 104 do not arrive at the receiver station 108 at the same time, thus causing reception difficulties.

Channel equalizers in the receiver stations 108 can ameliorate the echoed data to a certain extent, but at some point, the channel equalizers become ineffective, and the echoed data begins to compromise reception of the signal to the point where the data arriving later from other transmitters essentially becomes interference, and resulting data is unusable.

What is needed is a method and apparatus that synchronizes not only the carriers used in the transmission and reception of such data, but also, the data itself. The present invention satisfies that need.

SUMMARY OF THE INVENTION

To address the requirements described above, the present invention discloses a method and apparatus for transmitting media program information. In an illustrative embodiment, the method comprises the steps of receiving a channel coded data comprising the media program information, generating the first signal having the channel coded data and synchronization information, the first signal for transmitting the media program information for reception by a remote receiver station disposed in a coverage area of a first secondary transmitter and a second secondary transmitter, transmitting the first signal from a master transmitter, receiving the first signal in the first secondary transmitter, receiving the first signal in the second secondary transmitter, transmitting a first retransmitted signal having the media program information from the first secondary transmitter, and transmitting a second retransmitted signal having the media program information from the second secondary transmitter, wherein the first retransmitted signal is temporally offset from the second retransmitted signal by an amount determined at least in part according to the synchronization information and a common time reference.

In another embodiment, the apparatus comprises a master transmitter for receiving a channel coded data comprising the media program information and for generating the first signal having the channel coded data and synchronization information, a first secondary transmitter, for receiving the first signal and for transmitting a first retransmitted signal having the media program information from the first secondary transmitter, and a second secondary transmitter, for receiving the first signal and for transmitting a second retransmitted signal having the media program information from the second secondary transmitter, wherein the first retransmitted signal is temporally offset from the second retransmitted signal by an amount determined at least in part according to the synchronization information and a common time reference.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof and which is shown, by way of illustration, several embodiments of the present invention. It is understood that other embodiments may be utilized and structural changes may be made without departing from the scope of the present invention.

Figure 1:
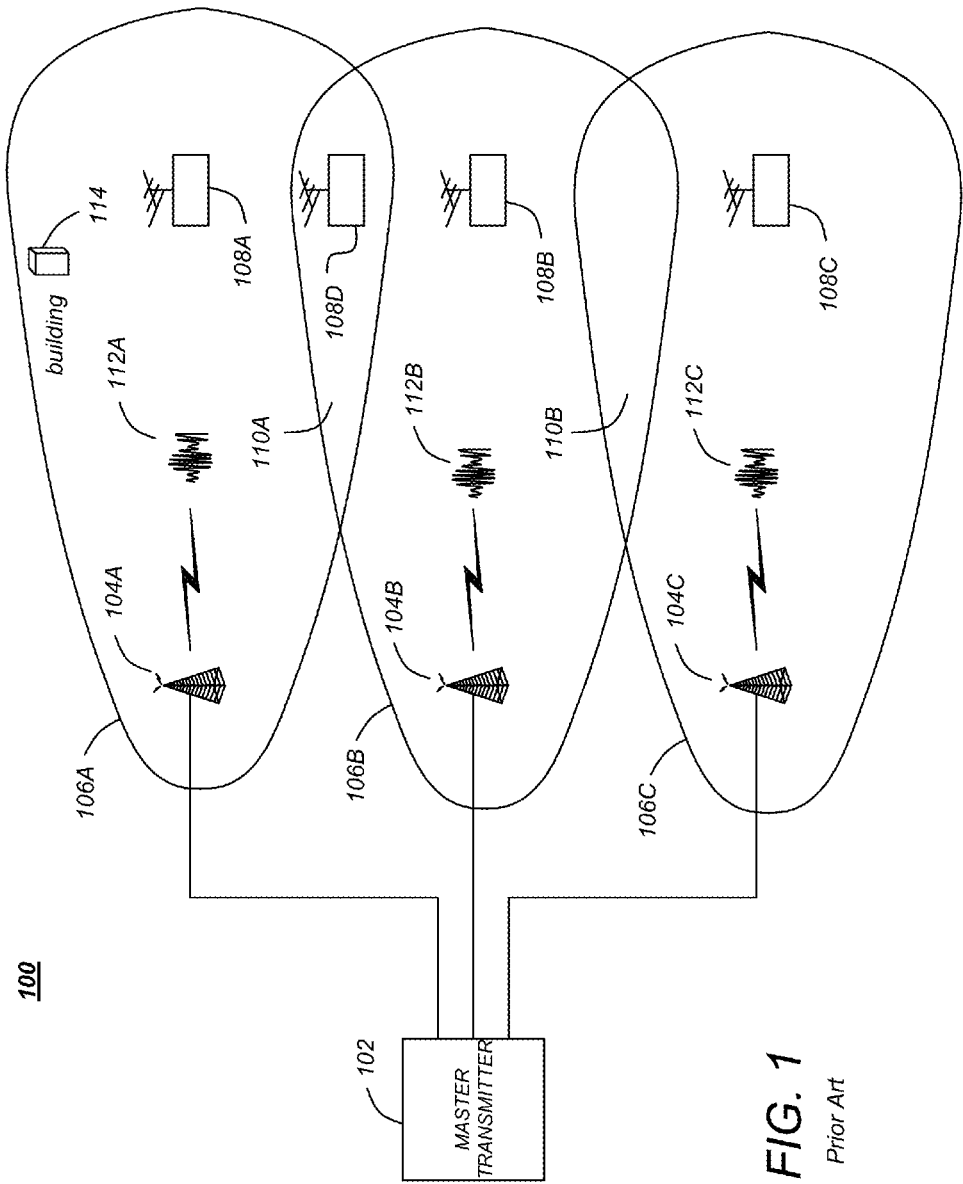
FIG. 1 is a diagram of a prior art transmission system.
Figure 2A:
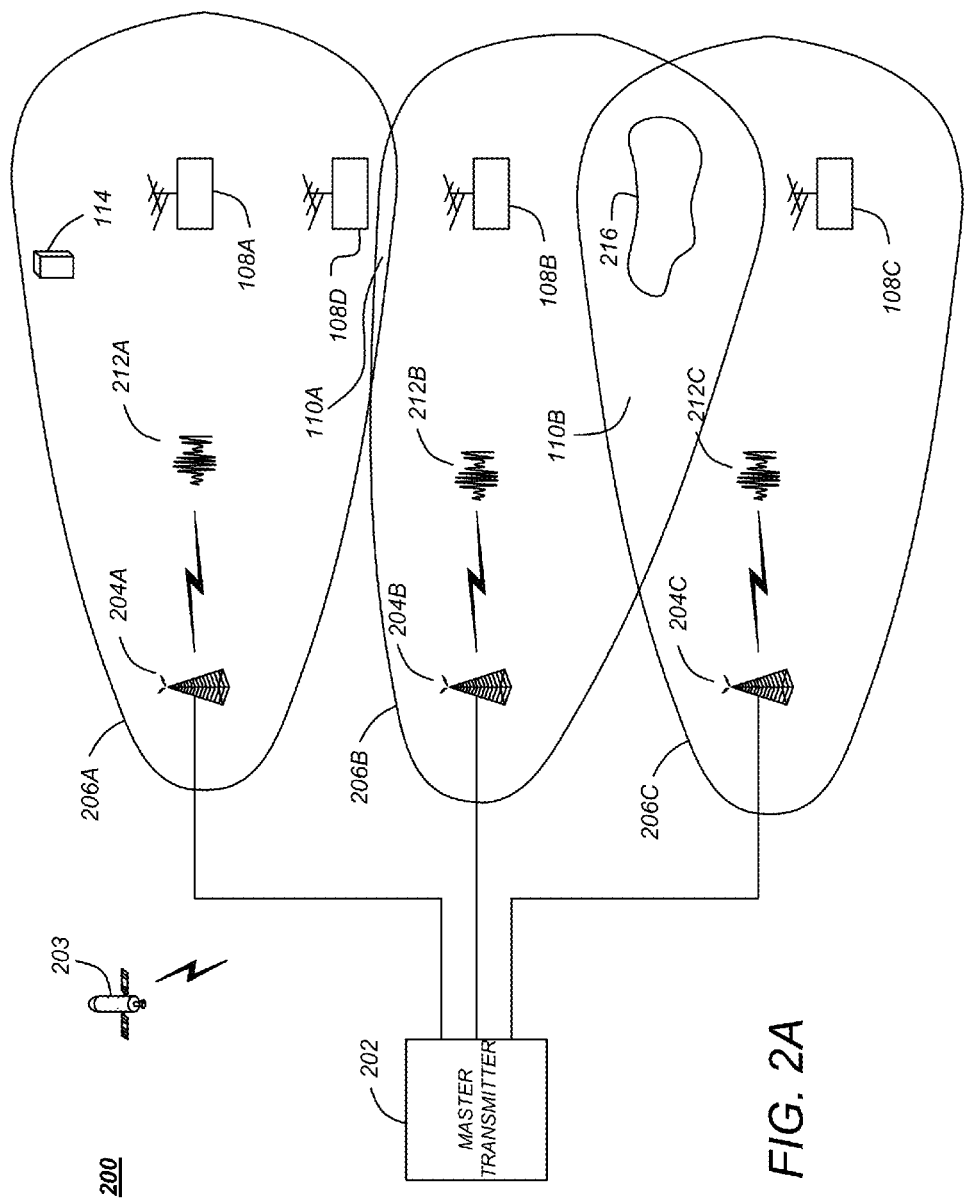
FIG. 2A is a diagram of an adaptive transmission system.

FIG. 2A is a diagram of an adaptive transmission system (ADS) 200. The ADS 200 includes a master transmitter 202 that is communicatively coupled a plurality of secondary transmitters 204A-204C (hereinafter alternatively referred to as transmitter(s) 204). The master transmitter 102 may be communicatively coupled with transmitters 204 via a wireless link (including radio frequency (RF), intermediate frequency (IF), microwave, optical frequencies) or a wired link. As was true with the transmission system depicted in FIG. 1, wireless communications may be via terrestrial transmission, airborne transmission or by satellite, and communications with one of the transmitters 204 may be wireless, while communications with another one of the transmitters 204 may be wired.

The transmitters 206 receive the signal from the master transmitter 202 and retransmit the received signal to receiver stations 108. Each of the transmitters 204 transmits provides a transmitted signal 212A-212C (hereinafter alternatively referred to as transmitted signal(s) 212) in coverage areas 206A-206C (hereinafter alternatively referred to as coverage area(s) 206). Note that the coverage area 206B related to transmitter 204B is shifted from the coverage area 106B illustrated in FIG. 1 so that there is less overlapping coverage between coverage area 206A and 206B than there is with coverage areas 106A and 106B and that overlapping coverage between coverage areas 206B and 206C include area 216, which may be an area where interference between the signals from transmitter 204B and 204 is permitted. For example, area 216 may represent a lake or a mountainous region with few or no receiver stations 108. Coverage areas 206A-206C are adjusted using by adjusting the phase of the carrier used to transmit signals 212A-212C and by delaying the data transmitted in retransmitted signals 212A-212C via a global common time reference that is independent from the signals received in the transmitters 204. In one embodiment, this global common time reference is a signal received from a satellite 203. For example, the satellite 203 may be a global positioning system (GPS) satellite, and the global common-time reference may be the clock that is included with the GPS signal.

Figure 2B:
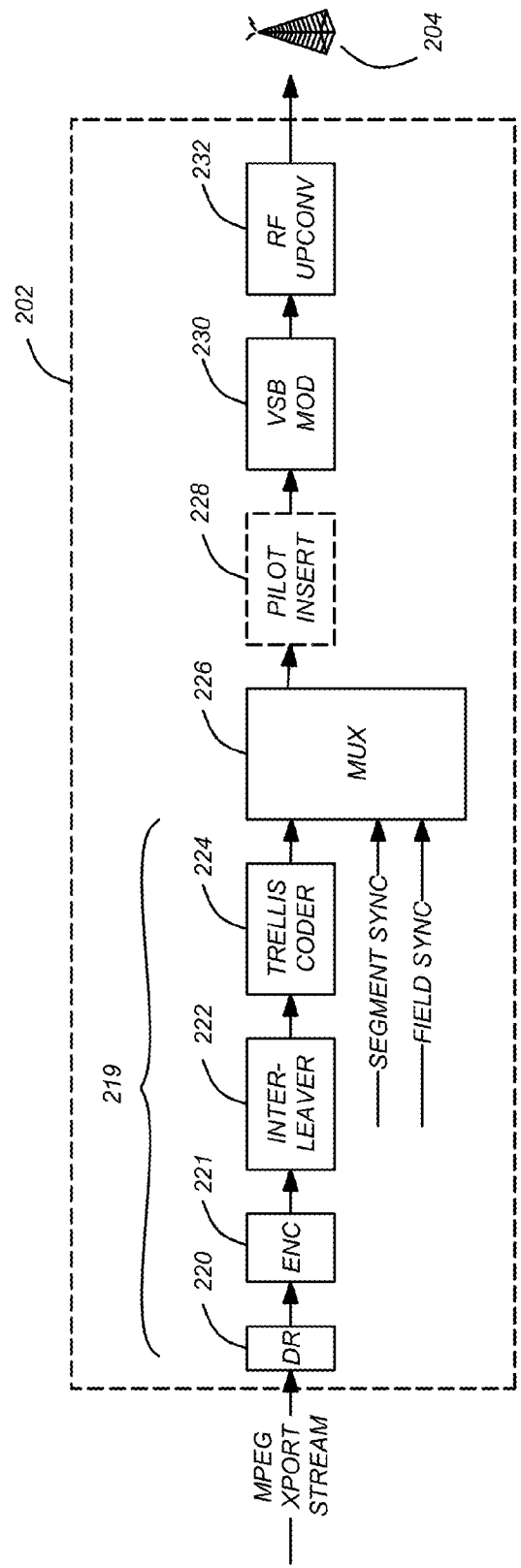
FIG. 2B is a diagram of a master transmitter.

FIG. 2B is a diagram of a master transmitter 202 transmitting an ATSC signal. The master transmitter 202 includes, for example, a channel coding section 219 that generates a channel coded signal that is provided to a synchronization multiplexer 226. The synchronization multiplexer 226 adds the field synchronization and segment synchronization segments described below. A pilot signal 270 is then inserted in the resulting digital signal by inserter 228. Optionally, the pilot signal 270 can be inserted by the secondary transmitters 204 as described below. The signal is then provided for to a modulator 230 and an RF upconverter 232 for transmission to the secondary transmitters 204. In one embodiment, the channel coding section 219 comprises a data randomizer 220 and an encoder 221 that accepts an MPEG data stream having a media program. In one embodiment, the encoder 221 is a forward error correcting encoder such as a Reed-Solomon (RS) encoder. The encoded data stream is provided to an interleaver 222, which interleaves the MPEG signal from the encoder 221 with other encoded MPEG signals, generated, for example, buy complimentary encoders. The interleaved signal is provided to a trellis coder 224 which trellis codes the interleaved data stream.

While it is known to add data to the MPEG transport stream before channel coding the signals for use in synchronization purposes, this solution to synchronization problems is not ideal, for several reasons. First, the synchronization information provided must undergo significant processing to recover the synchronization information. Not only does this require additional time and processing to accomplish, the process itself can introduce delays that must be accounted for. Further, channel coding itself introduces uncertainties in the resulting output data stream because the encoding and interleaving processes depend on initial conditions that may change with time. Instead, the embodiments described below use synchronization information added after channel coding to add information by which synchronization among the secondary transmitters may be accomplished. In this way, synchronization of the signals transmitted by the secondary transmitters 204 can be accomplished without the problems associated with synchronization information inserted before channel coding.

In one embodiment, the signal transmitted to the receiver 302A by the master transmitter 202 is an ATSC-compliant signal, as described in "A/53: ATSC Digital Television Standard Parts 1-6, 2007, published 3 Jan. 2007 by the Advanced Television Systems Committee, Inc., which document is hereby incorporated by reference herein. Pages 10-11 of Part 2 of this reference (relating to transmission) describe that the signal data is organized to include Data Frames consisting of two Data Fields 250A, 250B, each containing 313 Data Segments, as discussed below.

Figure 2C:
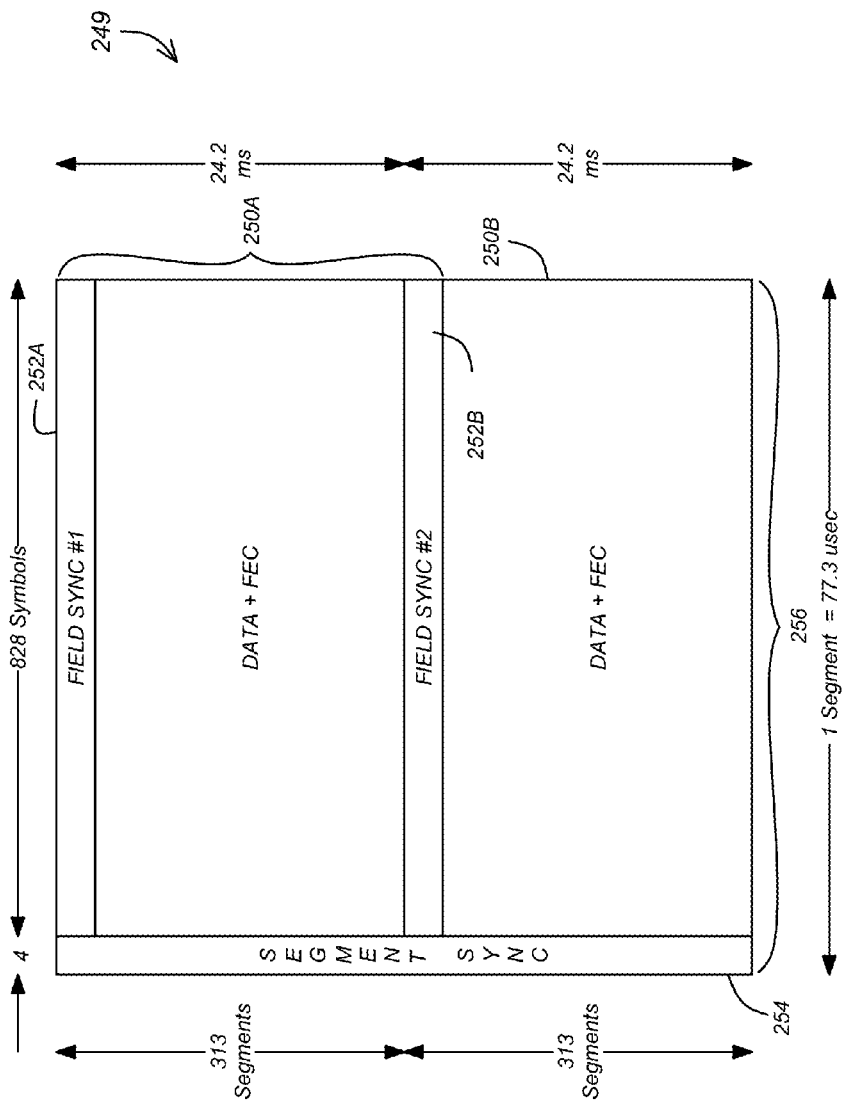
FIG. 2C is a diagram illustrating a data organization.

FIG. 2C is a diagram illustrates how the data is organized for transmission. Each Data Frame consists of two Data Fields 250A, 250B, each containing 313 Data Segments. The first Data Segment of each Data Field 250A, 250B is a unique synchronizing signal known as a Data Field Synchronization signal 252A, 252B, and includes the training sequence used by the equalizer in the receiving station 108 or transmitters 204. The remaining 312 Data Segments each carry the equivalent of the data from one 188-byte transport packet plus its associated Reed-Solomon-Forward Error Correction (RS-FEC) overhead. The actual data in each Data Segment comes from several transport packets because of data interleaving. In the case of E8-VSB transmission, the enhanced-coded 8-level symbols are dispersed among the normal 8-level symbols due to additional interleaving of enhanced coding. Each Data Segment 256 consists of 832 symbols, the first four 254 of which are transmitted in binary form and provide segment synchronization. Either the Data Field Synchronization signal 252 or the Data Segment Synchronization signal 254 can represent the synchronization information of the data received by the receiver 302A.

This Data Segment Synchronization signal 254 also represents the sync byte of the 188-byte MPEG-2-compatible transport packet. The remaining 828 symbols of each Data Segment carry data equivalent to the remaining 187 bytes of a transport packet and its associated RS-FEC overhead. These 828 symbols are transmitted as 8-level signals and therefore carry three bits per symbol. Thus, 828×3=2484 bits of data are carried in each Data Segment, which exactly matches the requirement to send a protected transport packet:

187 data bytes+20 RS parity bytes=207 bytes 207 bytes×8 bits/byte=1656 bits

Two-thirds rate trellis coding requires 3/2×1656 bits=2484 bits. The exact symbol rate is given by Equation 1 below:

$(S_r \text{ (MHz)})=4.5/286 \times 684=10.76 \ldots \text{MHz}$ (Equation 1)

The frequency of a Data Segment is given in Equation 2 below:

$f_{seg}=S_r/832=12.94 \ldots X103 \text{ Data Segments}/s$ (Equation 2)

The Data Frame rate is given by Equation (3) below:

$f_{frame}=f\text{seg}/626=20.66 \ldots \text{frames}/s$ (Equation 3)

The symbol rate Sr and the transport rate $T_r$ is locked to each other in frequency.

The 8-level symbols combined with the binary Data Segment Sync and Data Field Sync signals shall be used to suppressed-carrier modulate a single carrier. Before transmission, however, most of the lower sideband shall be removed. The resulting spectrum is flat, except for the band edges where a nominal square root raised cosine response results in 620 kHz transition regions.

Figure 2D:
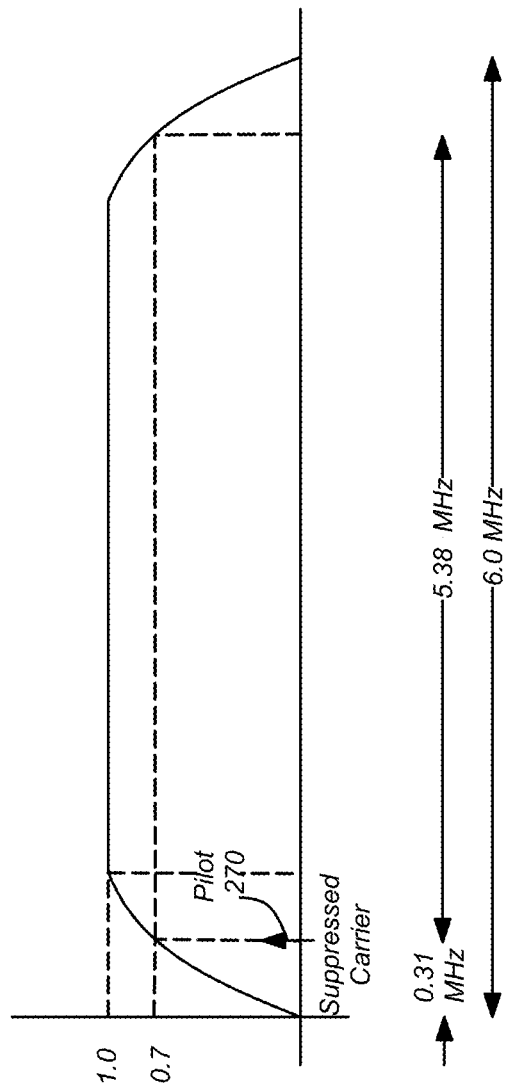
FIG. 2D is a diagram illustrating a nominal ATSC transmission spectrum.

FIG. 2D is a diagram illustrating the nominal VSB transmission spectrum. At the suppressed-carrier frequency, 310 kHz from the nominal lower band edge, a small pilot 270 is added to the signal.

In one embodiment, a high data rate mode is implemented. The high data rate mode trades off transmission robustness (28.3 dB signal-to-noise threshold) for payload data rate (38.57 Mbps). Most parts of the high data rate mode VSB system are identical or similar to the terrestrial system. A pilot, Data Segment Sync, and Data Field Sync are all used to provide enhanced operation. The pilot in the high data rate mode also is 11.3 dB below the data signal power. The symbol, segment, and field signals and rates are all the same, allowing either receiver to lock up on the other's transmitted signal. Also, the data frame definitions are identical. The primary difference is the number of transmitted levels (8 versus 16) and the use of trellis coding and NTSC interference rejection filtering in the terrestrial system.

The RF spectrum of the high data rate modem transmitter looks identical to the terrestrial system, as illustrated in FIG. 2D. A small in-phase pilot may be added to the data signal having the same suppressed carrier frequency as shown in FIG. 2D. This may be generated by adding a small (digital) DC level to every symbol (data and sync) of the digital baseband data plus sync signal (which for high data rates includes ±1, ±3, ±5, ±7, ±11, ±13 and ±15. The power of the pilot is 11.3 dB below the average data signal power.

Figure 2E:
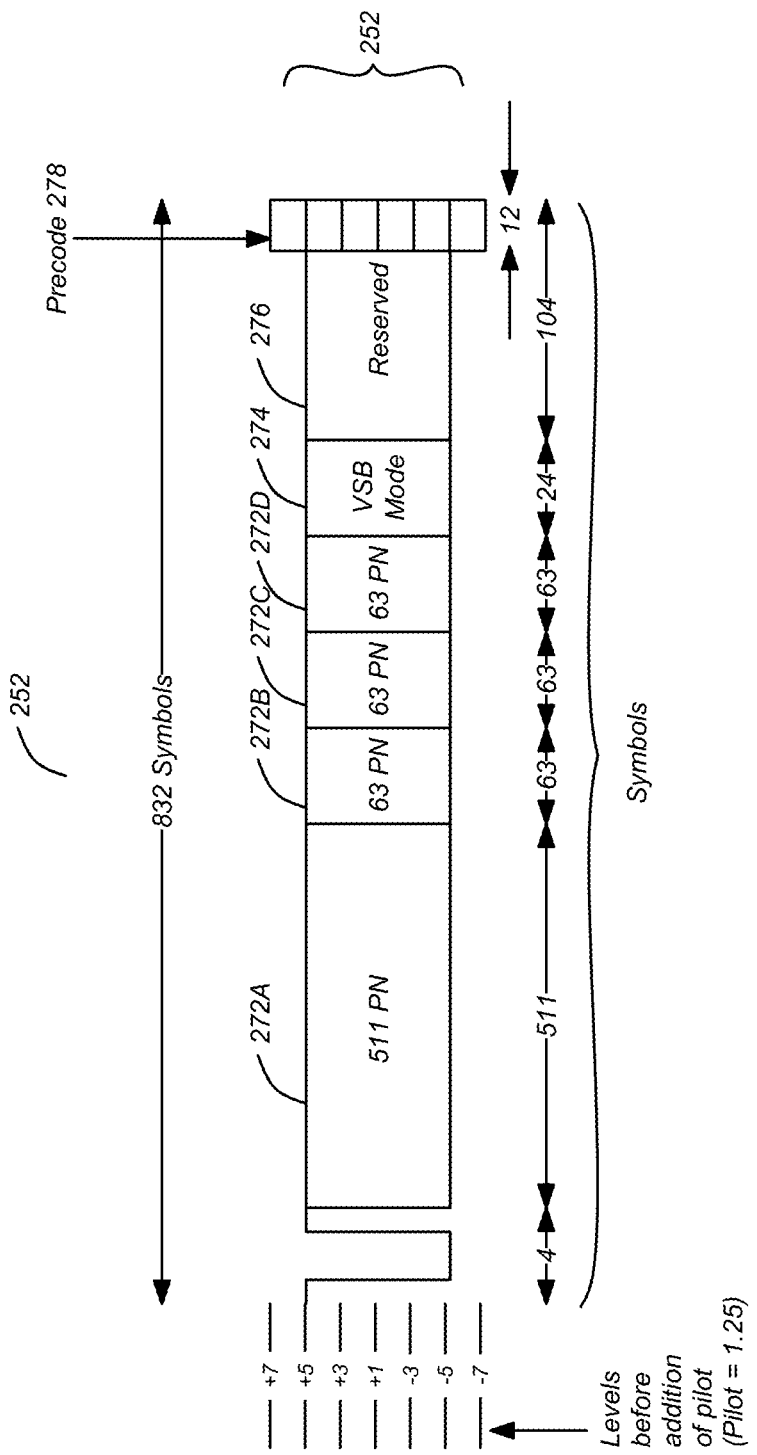
FIG. 2E is a diagram of an exemplary data field synchronization segment.

FIG. 2E is a diagram of an exemplary data field synchronization segment 252 that is at the beginning of each data field 250. The data field synchronization segment 252 includes several fixed pseudonormal (PN) sequences 272A-7272D, a fixed VSB mode indicator 274 (which indicates whether the data is VSB or enhanced VSB), reserved bits 276 and 12 symbols of precode information 278.

Figure 3:
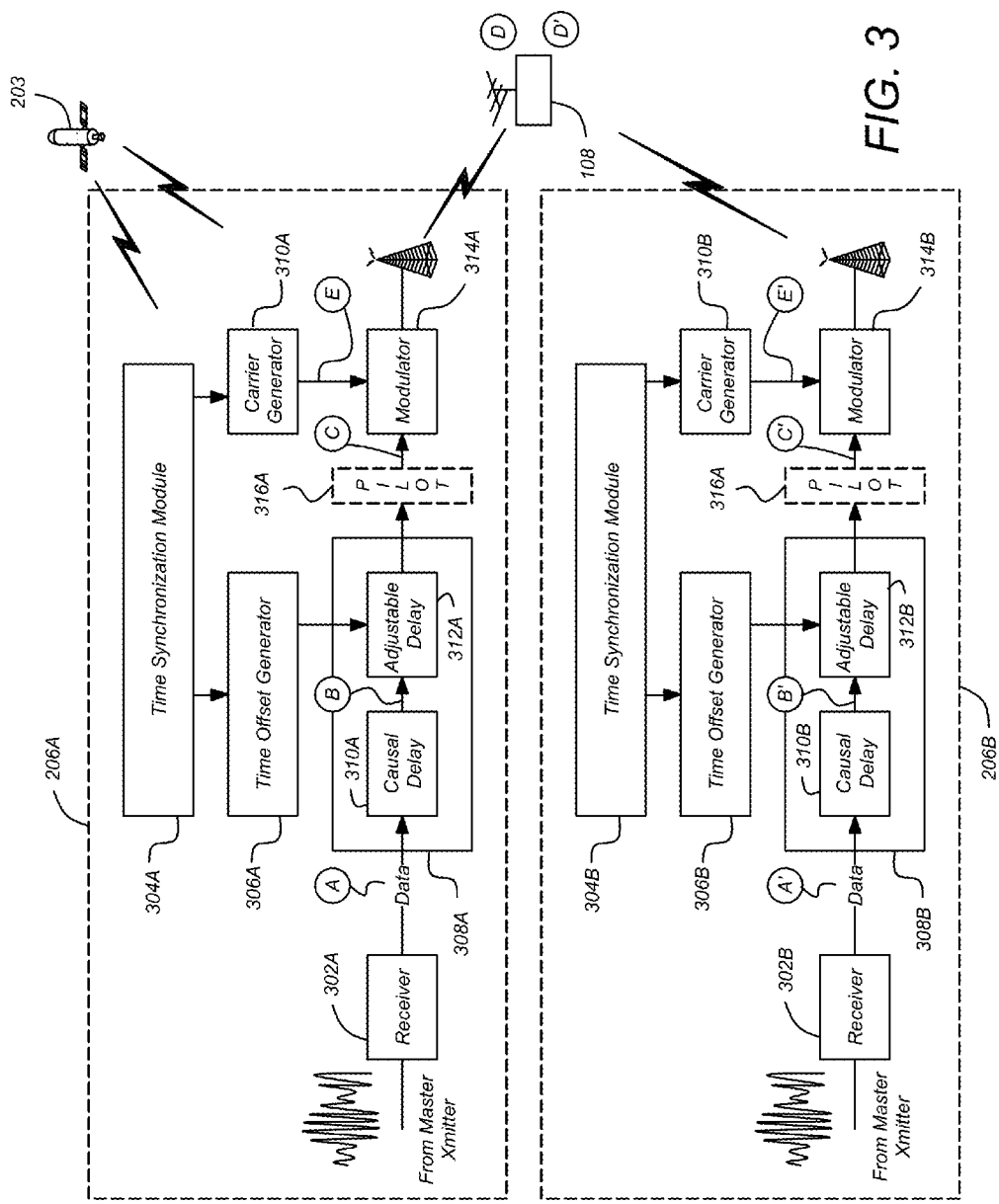
FIG. 3 is a diagram presenting one embodiment of the transmitters.

FIG. 3 is a diagram presenting one embodiment of the transmitters 206. A first transmitter (for example, transmitter 206A) comprises a receiver 302A for receiving a signal comprising the data transmitted from the master transmitter 202. The data includes synchronization information that is later used to synchronize the transmission from the transmitter 206 with that of other transmitters.

The first transmitter 206A also comprises a time synchronization module 304A that generates a globally common time reference. In one embodiment, this comprises a time synchronization receiver that receives a globally common time reference from a signal received from an external source. For example, the time synchronization receiver may comprise a GPS receiver, and the globally common time reference may be the clock available in the received GPS signal.

The first transmitter 206A also comprises a time offset generator 306A that generates a first time offset between synchronization information in the data received by the receiver 302A and the received globally common time reference generated by the time synchronization module. The time offset generator 306A may also compute the desired time to delay the transmission of the first retransmitted signal 212A relative to other retransmitted signals in order that the first retransmitted signal 212A is received synchronous with other retransmitted signals 212B and 212C by the intended receivers while minimizing interference. The data and the time offset are provided to a first delay module 308A, which delays the data generated by the receiver according to the time offset generated by the time offset generator 306A. In one embodiment, this delay includes a causal delay provided by a causal delay element 310A and an adjustable delay provided by an adjustable delay element 312B. A causal system is known as one in which the output is a function of past and/or current inputs to the system, but not future inputs to the system. For example, a moving average filter may be defined as:

$$y_n = \tfrac{1}{2}x_{n-1} + \tfrac{1}{2}x_{n+1}.$$

Such a filter is non-causal because the output depends upon a future input $x_{n+1}$. Such a system may be rendered causal by delaying the output of the moving average filter thusly:

$$y_n = \tfrac{1}{2}x_{n-1} + \tfrac{1}{2}x_{n-2}.$$

This delay may be provided by the causal delay element 310A, and may have a predetermined value that is sufficient to assure system causality under all circumstances. The value may also a constant value. The adjustable delay element 312 is used to provide a delay that synchronizes the data between the output of the first transmitter 206A and the other transmitters 206B-206C. This is further illustrated in the following discussion.

The first transmitter 206A may also include a carrier generator 310A that generates a carrier using the generated globally common time reference from the time synchronization module 304A in order to synchronize the carriers of the received signals from the first transmitter 206A and other transmitters 206B-206C. In this context, synchronization may in fact require that the carriers transmitted by each transmitter be out of phase by an amount required to assure that they are in phase when received.

If the pilot signal 270 used in the ATSC standard described above was not added by the master transmitter in block 228, the pilot signal 270 may be inserted into the delayed data by pilot signal inserter 316A before being provided to the modulator 314A.

The carriers and data are provided to a modulator 314A, which modulates the data. The modulated data is amplified and provided to an antenna for transmission to the receiver stations 108 as shown in FIG. 3.

Also illustrated in FIG. 3, are corresponding elements of a second transmitter 206B, which function and interrelationship with other second transmitter 206B elements are identical to those described above for the first transmitter 206A.

Figure 4A:
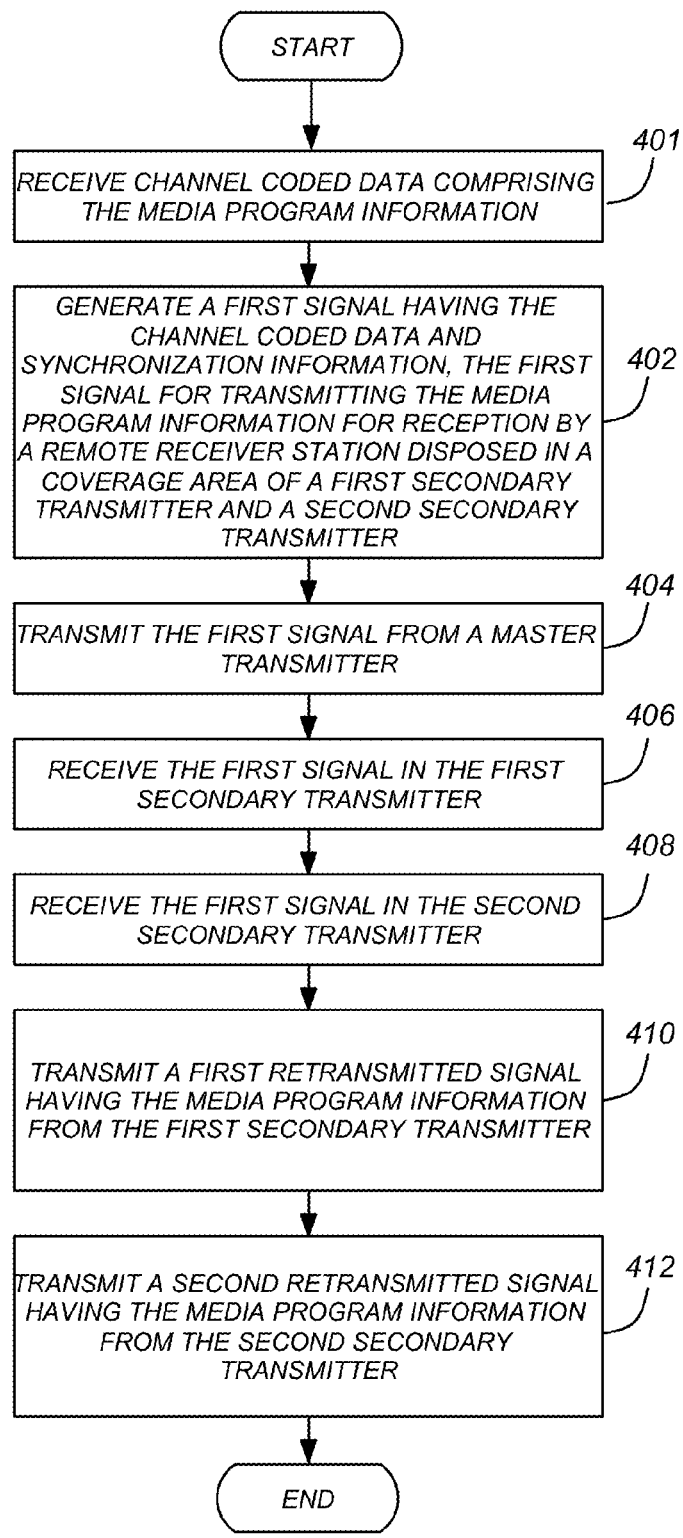
FIGS. 4A-4C are diagrams illustrating exemplary method steps that can be used to implement one embodiment of the present invention.

FIG. 4A is a diagram illustrating exemplary method steps that can be used to implement one embodiment of the present invention. In block 401, channel coded data comprising the media program information is received. The information may be received, for example, from the channel coding section 219 shown in FIG. 2B. In block 402, a first signal is generated that has the channel coded data and synchronization information. In one embodiment, the first signal is the ATSC signal illustrated and described in FIGS. 2C-2E. The first signal transmits the media program information from the master transmitter 202 to the secondary transmitters 206. This signal is received in the secondary transmitters 206 for rebroadcast to remote receivers 108 in the coverage area. In block 404, the first signal is transmitted by the master transmitter 202. The first signal is received by the first secondary transmitter 108A and the second secondary transmitter 108B, as shown in blocks 406-408. In block 410, a first retransmitted signal 212A having the media program information is transmitted from the first secondary transmitter 204A and in block 412, a second transmitted signal 212B having the media program is transmitted from the second secondary transmitter 204B. The first retransmitted signal 212A is temporally offset from the second retransmitted signal 212B at least in part according to the synchronization information.

Figure 5A:
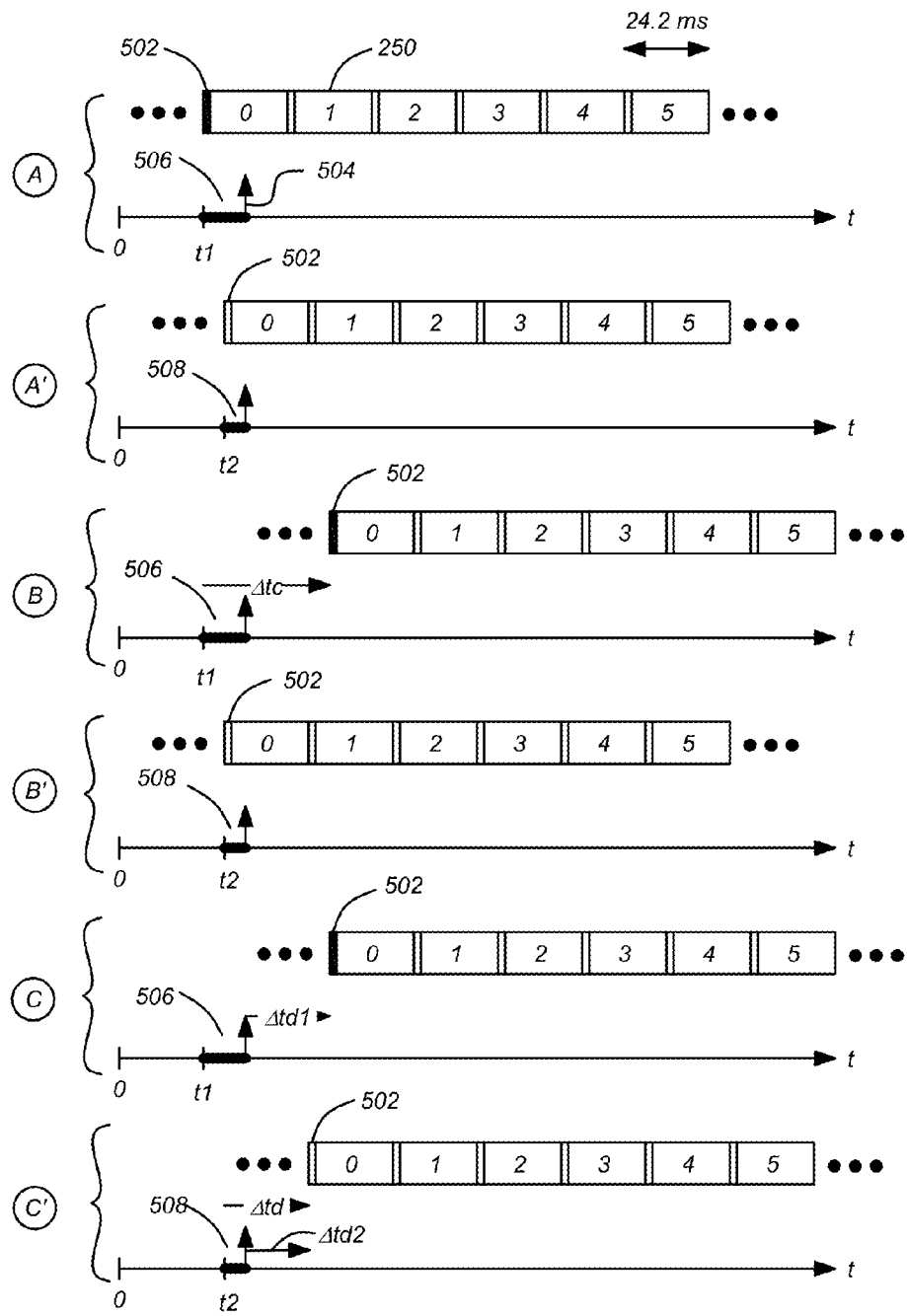
FIG. 5A-5C are diagrams illustrating the temporal appearance of the data received and processed by the first transmitter and the second transmitter and showing the signal received at the receiver station.

FIG. 5A is a diagram illustrating the temporal appearance of the data received and processed by the first transmitter 206A and the second transmitter 206B. The plot labeled "A" illustrates the data received by receiver 302A, and illustrates synchronization information 502. Plot A' illustrates the same data, with the same synchronization information 502, as received by receiver 302B. Note that the data produced by receiver 302A may not be produced simultaneously by receiver 302B. FIG. 5A, for example, illustrates a case where the data produced by receiver 302B is delayed from that of receiver 302A by the time period $t_2-t_1$. This time difference can be due to a variety of factors, including multipath, or processing delays between the master transmitter 202 and the receivers 302A and 302B.

Figure 4B:
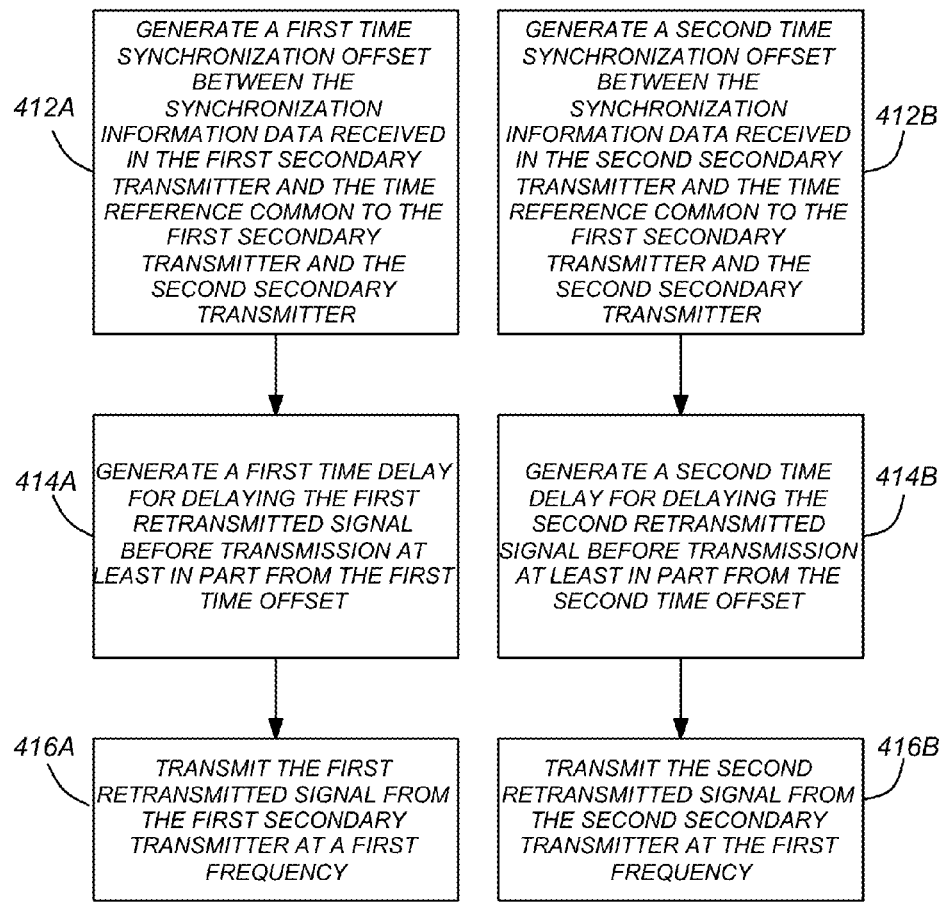

FIG. 4B is a diagram illustrating one embodiment of how the temporal offset between the first and second retransmitted signals 212 may be determined and the first and second retransmitted signals 212 transmitted.

As shown in block 412A, a first time offset 506 between the synchronization information data received in the first secondary transmitter and the time reference 504 is generated. In block 414A, a first time delay is generated at least in part from the first offset, and used to delay the first retransmitted signal. In block 414B, the first retransmitted signal 202A is transmitted from the first secondary transmitter 204A at the first frequency. Blocks 412B-414B illustrate analogous operations being performed by the second secondary transmitter 204B.

Figure 4C:
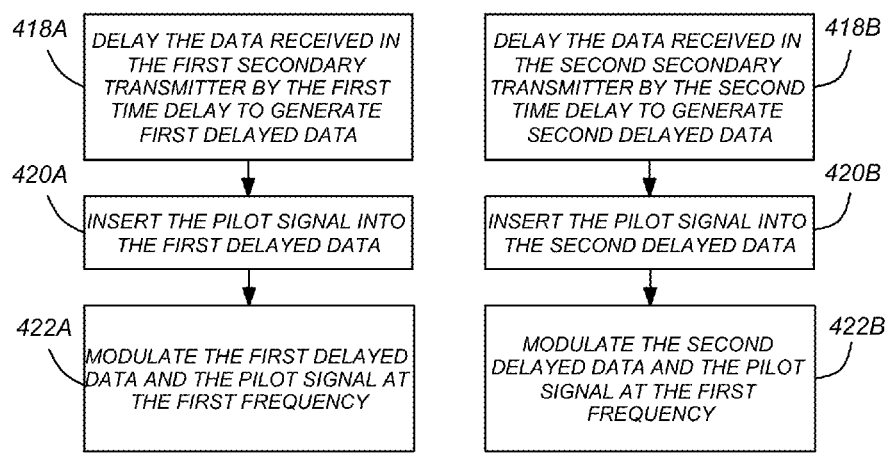

FIG. 4C is a diagram illustrating exemplary operations that can be used to transmit the first and second retransmitted signals 212 from the first and second secondary transmitters 204, respectively. First, the data received by the secondary transmitter 204 is delayed by the secondary transmitter 204 by the time delay to generate delayed data, as shown in blocks 418A and 418B. This may be accomplished via the delay modules 308A and 308B, respectively. The pilot signal is then inserted into the delayed data as shown in blocks 420A and 420B. This can be performed by the pilot signal inserters 316A and 316B, respectively. Finally, the delayed data and the pilot signal are modulated at the first frequency by modulators 314, as shown in blocks 422A and 422B.

The generation of the temporal amount to delay the first received data and the second received data is further illustrated in FIG. 5A. As described above, it is important for implemented systems to be causal and such causality can be assured by delaying one or more inputs to the system. Accordingly, the first transmitter 206A and/or the second transmitter 206B may implement a causal delay element 310A and/or 310B in order to delay the data received from the receiver 302A and/or 302B. In the embodiment illustrated in FIG. 5A, the data received from the first receiver 302A is delayed an amount $\Delta t_c$ as shown in plot B. This allows the data from the second receiver 302B to be significantly delayed yet still remain a causal system. It is also possible to delay the data from the first receiver 302B to assure causality or to delay the data from both receivers to assure causality.

A computation is performed to determine the desired time difference between the signal transmitted by the first transmitter 206A and the second transmitter 206B in order to maximize or minimize certain transmission criteria. For example, a set of receiver stations 108 can be separated into a first group of receiver stations 108 that should receive the broadcast signal and a second group of receiver stations 108 that should not receive the broadcast signal. The time delay between the signal transmission from the first transmitter 306A and the second transmitter 306B can be adjusted to maximize the number of receiver stations 108 that can receive the broadcast signal and to minimize the number of receiver stations 108 that cannot receive the broadcast signal. Further, the delay can be adjusted so that multipath interference is brought to acceptable levels (levels that do not interfere with reception) for receiver stations that are intended to receive the broadcast signal. Such computations may be performed well in advance of the signal transmission, or may be performed in real time by measuring the signals received at different locations, and adjusting the delay in each of the transmission stations to maximize the reception of signals at the desired locations.

The desired time difference is determined for either or both of the transmitters 206A and 206B and implemented using either or both of the causal delay elements 310 and adjustable delay elements 312 of the transmitters 206. In the embodiment shown in FIG. 5A, the desired time difference is implemented by adding a causal delay only to the data received by the first receiver 302A as shown in plot B and a delay $\Delta t_d$ to the data received by the second receiver 302B as shown in plot C'. The result is that first data is delayed relative to the reference 506 by delay $\Delta t_{d1}$, and the second data is delayed relative to the reference 506 by delay $\Delta t_{d2}$.

Figure 5B:
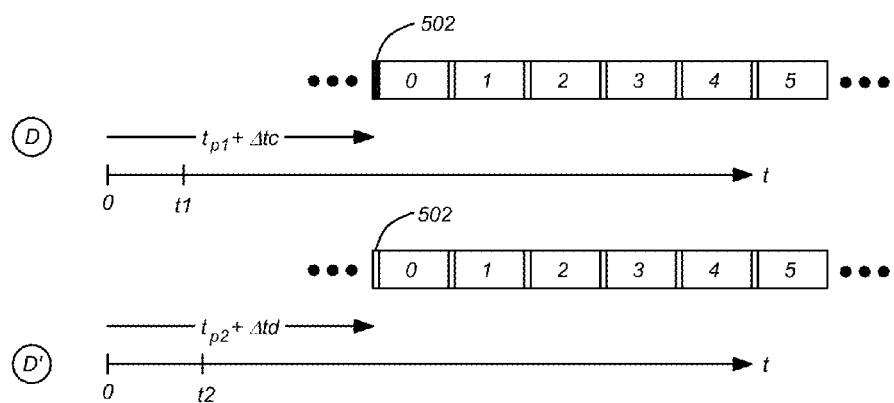

FIG. 5B is a diagram showing the signal received at the receiver station 108. Assuming the transmission from transmitter 206A takes time $t_{p1}$ to travel from transmitter 206A to the receiving station 108 and the transmission from transmitter 206B takes time $t_{p2}$ to travel from transmitter 206B to the receiving station 108, $\Delta t_d$ and $\Delta t_c$ are chosen so that the data embodied in the signal received at the receiving station 108 is received at substantially the same time, or at least times temporally close enough to permit the receiving station 108 to receive the signals. This may require, for example, that the signals be received by the receiving station 108 such that the a receiving station channel equalizer can account for and correct the time differences.

Figure 5C:
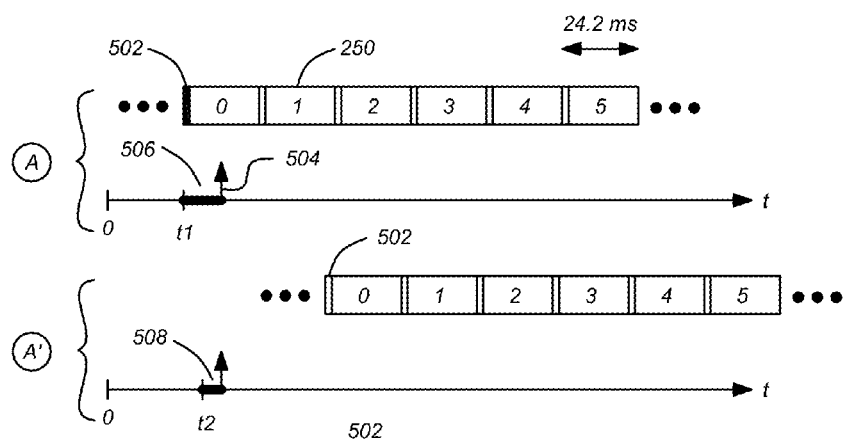

Although the synchronization information in the field sync 252 can be used for synchronization purposes, if the transmission between the master transmitters 202 and the secondary transmitters 204 results in a delay that is greater than the 24.2 msec length of the field 250, it will not be possible to determine whether the delay is a particular value or that particular value plus N·24.6 msec, where N is an positive integer. This situation is illustrated in FIG. 5C. In this situation, the delay of the signal received by the second transmitter 204B is greater than the 24.2 msec duration of a frame, so the synchronization information 502 can only provide ambiguous information regarding the delay (the delay may be the value $t_d$ indicated by the synchronization information, or may be $t_d$+[N·24.2 msec], where N=0, 1, 2, . . . , n)

To deal with this possibility, one embodiment of the invention configures the synchronization information to include ambiguity-resolving information within the data transmitted from the master transmitter 202 as described below.

Referring back to FIG. 2E, most of the symbols in the data field synchronization segment 252, are fixed. Any information contained in such symbols are either known or can be inferred by the secondary transmitters 204 without receiving the symbols, and the symbols therefore carry no information in the information theory sense (i.e. the symbols have zero entropy). Hence, some of these symbols can be "borrowed" for use in the transmission from the master transmitter 202 to the secondary transmitters 204 to convey timing information that can be used to resolve otherwise ambiguous synchronization information. These borrowed symbols may be used only to transmit timing information from the master transmitter 202 to the secondary transmitters 204 but not from the secondary transmitters 204 to the receiver stations 108 and therefore, prior to transmission to the receiver stations 108, the "borrowed symbols" can be replaced with the fixed or known symbols that were in the original data stream before substitution of the ambiguity resolving information. These additional symbols may take the form of a counter or a time stamp.

Figure 6:
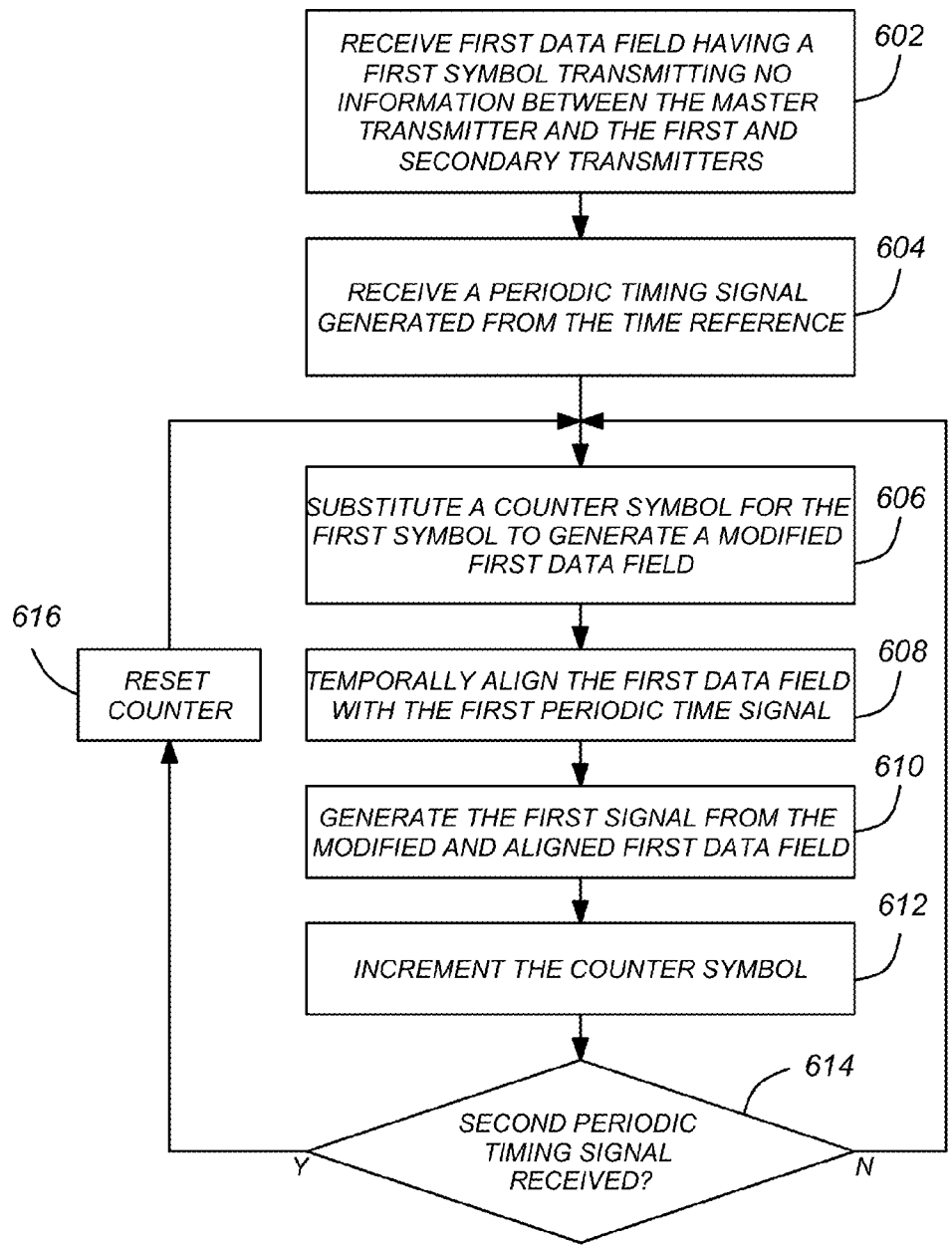
FIG. 6 is a diagram presenting an exemplary process that can be used to resolve temporal ambiguities in the synchronization data.
Figure 7:
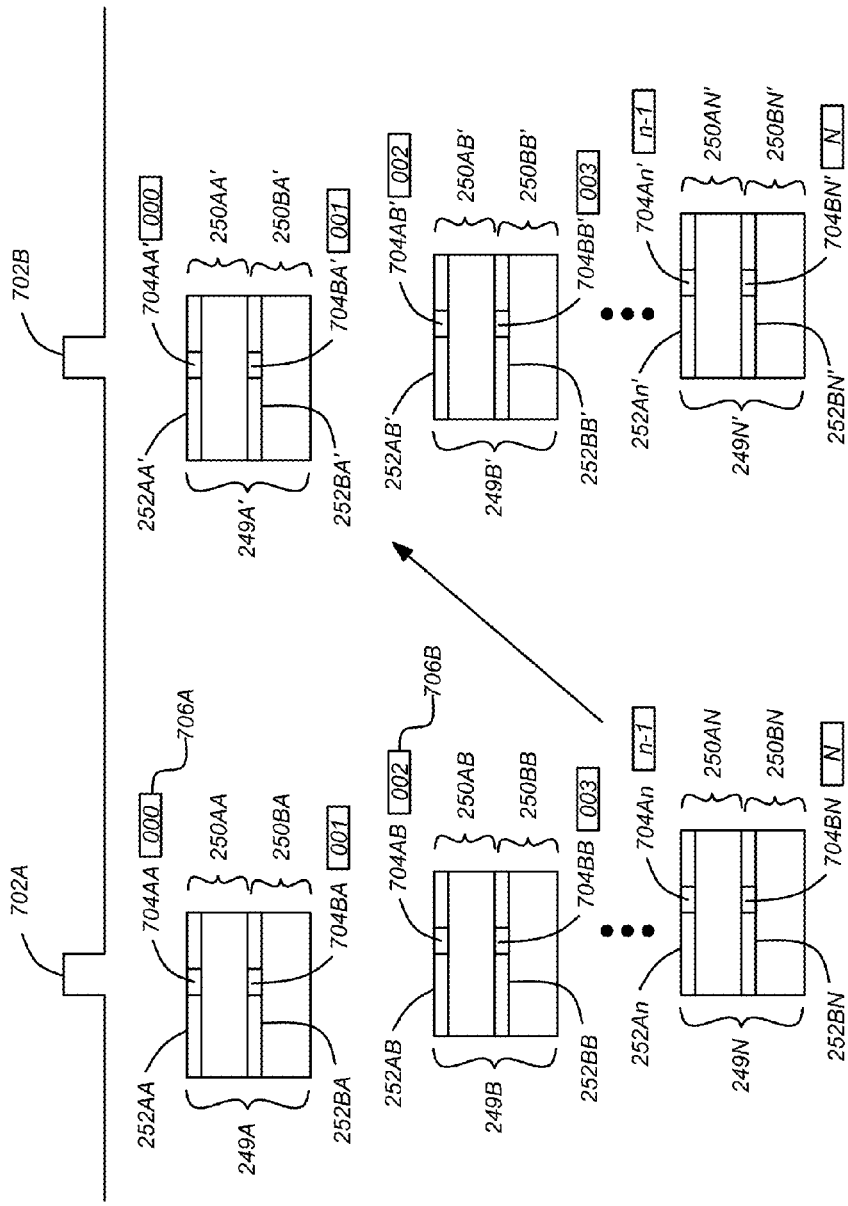
FIG. 7 is a diagram illustrating the process described in FIG. 6.

FIG. 6 is a diagram presenting an exemplary process that can be used to resolve temporal ambiguities in the synchronization data. FIG. 7 is a diagram illustrating the process of FIG. 6.

Turning to FIG. 6 and referring to FIG. 7, a first data field 250AA is received, as shown in block 602. The first data field has at least a first symbol transmitting no information between the master transmitter 202 and the secondary transmitters 204. A periodic timing signal 702A is also received, as shown in block 604. In one embodiment, the periodic timing signal 702A is generated by the master transmitter 202 from a global signal such as a GPS dock, and comprises a periodic (e.g. once per second) pulse. Next, a counter symbol is substituted for the first symbol, thereby generating a modified first data field, as shown in block 606. In one embodiment, for example, upon receiving the pulse (and in the illustrated embodiment, the leading edge of the pulse), the counter is reset, and value of the reset counter is substituted for symbol(s) that were originally in the data field. For example, referring to FIG. 7, a data frame 249A includes a first field 250AA and a second field 250BA, and the first field 250AA has synchronization information in the field sync segment 252AA that includes one or more symbols 704AA that convey no information from the master transmitter 202 to the secondary transmitters 204. One or more counter symbols 706 can be substituted for the symbols 704AA.

The first data field 250AA is then temporally aligned with the first periodic time signal, as shown in block 608, and used to generate the first signal, as shown in block 610. In block 612, the counter is incremented, and if a second periodic timing signal 702B has not been received, the incremented counter symbol 706B is substituted for the corresponding symbols in the second data field 250BA. The process continues n times, with the incremented counter being inserted for the symbols until a second periodic timing signal 702B is received, at which time, the counter is reset, and the process begins anew, as shown in blocks 612-616 and frames 249A'-249N'.

When the data field is received from the master transmitter 202, the secondary transmitters 204 can read the counter, and by comparing the counter value with a periodic timing signal locally generated from the same time reference (for example, the GPS dock), the secondary transmitters 204 can resolve any temporal ambiguities in the synchronization information. For example, if the first secondary transmitter 204A receives a data field with the counter at value 003, the first secondary transmitter can determine that the received data field 250BB was the third data field since the timing signal 702A, thus disambiguating the synchronization data. For example, if it is desired to process the first signal received in the secondary transmitters 204 from the master transmitter 202 so that they are aligned in time, the secondary transmitters 204 can delay or advance the signal received so that they are processed at the same time relative to the timing signals.

Synchronization ambiguities can also be resolved by replacing the informationless symbols in the data fields with a time stamp, for example, the GPS dock data. To implement this embodiment, the master transmitter computes a time stamp from the GPS dock, and substitutes this time stamp for the informationless symbols to create modified data fields, and those modified data fields are used to generate the first signal that is transmitted to the secondary transmitters. When received by the secondary transmitters 204, the time stamp can be used to resolve any synchronization ambiguities in the synchronization information.

The global time reference can also be used to synchronize the carriers received by the receiving station from the first transmitter 206A and the second transmitter 206B. This can be accomplished by using the global time reference to generate the carrier as shown in FIG. 3, or by simply delaying one or more of the carriers.

Figure 8:
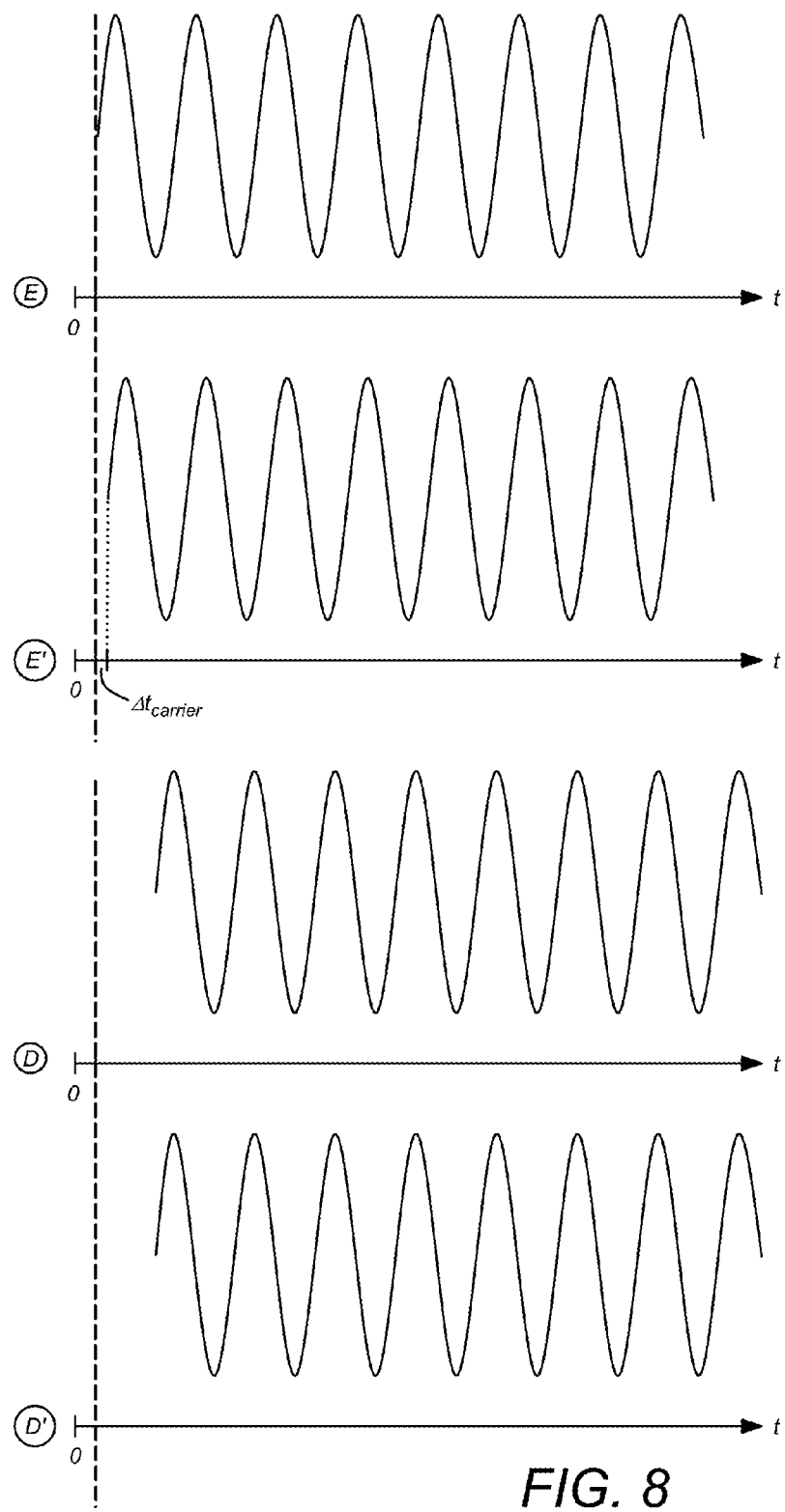
FIG. 8 is a diagram showing a temporal comparison of the carrier produced by the first carrier generator and the second carrier generator and received in the receiver station.

FIG. 8 is a diagram showing a temporal comparison of the carrier produced by the first carrier generator 310 and the second carrier generator 310B. In order to assure that the carriers of the signals received at the receiving station 108 from each transmitter are sufficiently in phase, the carrier from carrier generator 310A and/or carrier generator 310B may be delayed by $\Delta t_{carrier}$ so that the carriers arrive with the same or substantially the same phase.

Figure 9:
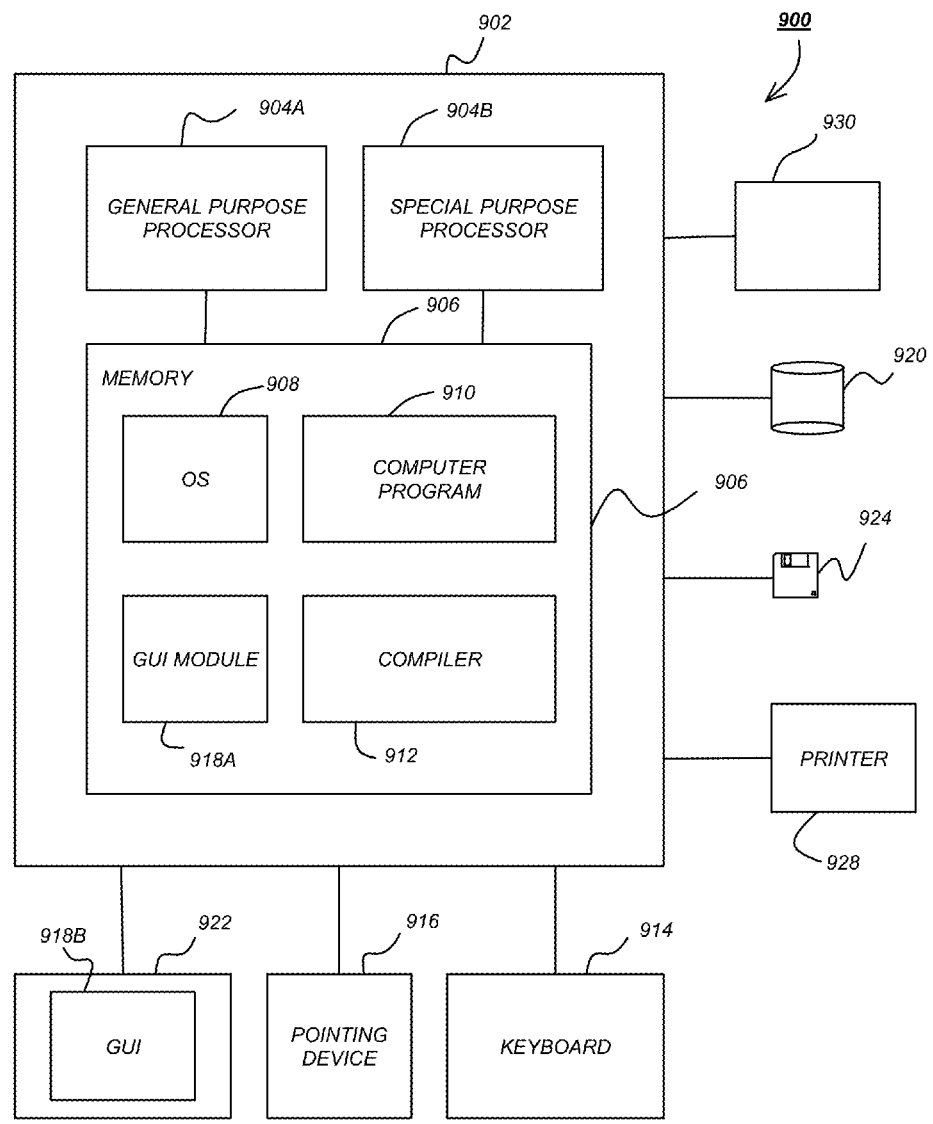
FIG. 9 is a diagram illustrating an exemplary computer system that could be used to implement elements of the present invention.

FIG. 9 is a diagram illustrating an exemplary computer system 700 that could be used to implement elements of the present invention, including the time offset generators 306 and the delay modules 308. A computer 902 comprises a general purpose hardware processor 904A and/or a special purpose hardware processor 904B (hereinafter alternatively collectively referred to as processor 904) and a memory 906, such as random access memory (RAM). The computer 902 may be coupled to other devices, including input/output (I/O) devices such as a keyboard 914, a mouse device 916 and a printer 928.

In one embodiment, the computer 902 operates by the general purpose processor 904A performing instructions defined by the computer program 910 under control of an operating system 908. The computer program 910 and/or the operating system 908 may be stored in the memory 906 and may interface with the user and/or other devices to accept input and commands and, based on such input and commands and the instructions defined by the computer program 910 and operating system 908 to provide output and results.

Output/results may be presented on the display 922 or provided to another device for presentation or further processing or action. In one embodiment, the display 922 comprises a liquid crystal display (LCD) having a plurality of separately addressable pixels formed by liquid crystals. Each pixel of the display 922 changes to an opaque or translucent state to form a part of the image on the display in response to the data or information generated by the processor 904 from the application of the instructions of the computer program 910 and/or operating system 908 to the input and commands. Other display 922 types also include picture elements that change state in order to create the image presented on the display 922. The image may be provided through a graphical user interface (GUI) module 918A. Although the GUI module 918A is depicted as a separate module, the instructions performing the GUI functions can be resident or distributed in the operating system 908, the computer program 910, or implemented with special purpose memory and processors.

Some or all of the operations performed by the computer 902 according to the computer program 910 instructions may be implemented in a special purpose processor 904B. In this embodiment, some or all of the computer program 910 instructions may be implemented via firmware instructions stored in a read only memory (ROM), a programmable read only memory (PROM) or flash memory within the special purpose processor 904B or in memory 906. The special purpose processor 904B may also be hardwired through circuit design to perform some or all of the operations to implement the present invention. Further, the special purpose processor 904B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 902 may also implement a compiler 912 which allows an application program 910 written in a programming language such as COBOL, C++, FORTRAN, or other language to be translated into processor 904 readable code. After completion, the application or computer program 910 accesses and manipulates data accepted from I/O devices and stored in the memory 906 of the computer 902 using the relationships and logic that was generated using the compiler 912.

The computer 902 also optionally comprises an external communication device such as a modem, satellite link, Ethernet card, or other device for accepting input from and providing output to other computers.

In one embodiment, instructions implementing the operating system 908, the computer program 910, and/or the compiler 912 are tangibly embodied in a computer-readable medium, e.g., data storage device 920, which could include one or more fixed or removable data storage devices, such as a zip drive, floppy disc drive 924, hard drive, CD-ROM drive, tape drive, or a flash drive. Further, the operating system 908 and the computer program 910 are comprised of computer program instructions which, when accessed, read and executed by the computer 902, causes the computer 902 to perform the steps necessary to implement and/or use the present invention or to load the program of instructions into a memory, thus creating a special purpose data structure causing the computer to operate as a specially programmed computer executing the method steps described herein. Computer program 910 and/or operating instructions may also be tangibly embodied in memory 906 and/or data communications devices 930, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 902.

Although the term "computer" is referred to herein, it is understood that the computer may include portable devices such as cellphones, portable MP3 players, video game consoles, notebook computers, pocket computers, or any other device with suitable processing, communication, and input/output capability.

While in the foregoing example, delays were implemented in the remote transmitters 206, embodiments are possible in which the master transmitter 202 adds the appropriate delays to each signal transmitted to the remote transmitters 204. However, this embodiment is less desirable, as time delays in the master transmitter 202 to remote transmitter 204 communication path are more difficult to account for. It is also noted that although the foregoing uses a GPS satellite for the global time reference, other time references can be used, so long as they are of sufficient accuracy and available at the transmitters 204C.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of transmitting media program information, comprising:
   receiving channel coded data comprising the media program information;
   generating a native signal having the channel coded data and native periodic synchronization information, the native signal for transmitting the media program information for reception by a remote receiver station disposed in a coverage area of a first secondary transmitter and a second secondary transmitter, the native periodic synchronization information having a time ambiguity with respect to a time reference common to a master transmitter, the first secondary transmitter, and the second secondary transmitter;
   generating a first signal from the native signal, the first signal having the channel coded data and time ambiguity resolvable periodic synchronization information generated from the native periodic synchronization information;
   transmitting the first signal from the master transmitter;
   receiving the first signal in the first secondary transmitter;
   receiving the first signal in the second secondary transmitter;
   resolving the time ambiguity of the native periodic synchronization information according to the time ambiguity resolvable periodic synchronization information;
   transmitting a first retransmitted signal having the media program information from the first secondary transmitter; and
   transmitting a second retransmitted signal having the media program information from the second secondary transmitter;
   wherein the first retransmitted signal is temporally offset from the second retransmitted signal by an amount determined at least in part according to the time ambiguity resolved periodic synchronization information and the common time reference.

2. The method of claim 1, wherein the time ambiguity-resolvable periodic synchronization information is generated from the native periodic synchronization information at least in part by modifying the native periodic synchronization information.

3. The method of claim 1, wherein modifying the native periodic synchronization information comprises:
   generating a substitute symbol; and
   substituting the generated symbol for a native symbol of the native periodic synchronization information.

4. The method of claim 3, wherein the native symbol transmits no information between the master transmitter and the first secondary transmitter and the second secondary transmitter.

5. The method of claim 3, wherein:
   the native signal comprises a plurality of frames, each having a respective portion of the native signal and the native periodic synchronization information; and
   the substitute symbol is a counter, and generating the substitute signal comprises:

generating a counter;
substituting the generated counter for the native symbol of the native periodic synchronization information of a frame of the plurality of frames;
incrementing the counter; and
substituting the incremented counter for the native symbol of the native periodic synchronization information of a frame of the plurality of frames temporally following a preceding frame of the plurality of frames.

6. The method of claim 3, further comprising:
substituting the native symbol for the substitute symbol before transmitting the first retransmitted signal from the first secondary transmitter; and
substituting the native symbol for the substitute symbol before transmitting the second retransmitted signal from the second secondary transmitter.

7. The method of claim 2, wherein the native periodic synchronization information is modified to include a time stamp generated from the common time reference.

8. The method of claim 1, wherein the native signal comprises an Advanced Television Systems Committee (ATSC) standard signal, and the native periodic synchronization information comprises field synchronization information.

9. The method of claim 8, wherein the common time reference is a global time reference comprising a global positioning system (GPS) time reference.

10. The method of claim 1, wherein:
transmitting the first retransmitted signal having the media program information from the first secondary transmitter comprises:
generating a first time delay for delaying the first retransmitted signal before transmission by the first secondary transmitter at least in part from a first synchronization time offset between the time ambiguity resolved periodic synchronization information received in the first secondary transmitter and the common time reference; and
transmitting the first retransmitted signal from the first secondary transmitter at a first frequency;
transmitting the second retransmitted signal having the media program information from the second secondary transmitter comprises:
generating a second time delay for delaying the second retransmitted signal before transmission by the second secondary transmitter at least in part from a second time synchronization offset between the time ambiguity resolved periodic synchronization information received in the first secondary transmitter and the common time reference; and
transmitting the second retransmitted signal from the second secondary transmitter at the first frequency.

11. The method of claim 10, wherein the first retransmitted signal and the second retransmitted signal include a pilot signal and wherein:
transmitting the first retransmitted signal from the first secondary transmitter at the first frequency comprises:
delaying data received in the first secondary transmitter by the first time delay to generate first delayed data;
inserting the pilot signal into the first delayed data; and
modulating the first delayed data and the pilot signal at the first frequency;
transmitting the second retransmitted signal from the second secondary transmitter at the first frequency comprises:
delaying the data received in the second secondary transmitter by the second time delay to generate second delayed data;
inserting the pilot signal to the second delayed data; and
modulating the second delayed data and the pilot signal at the first frequency.

12. The method of claim 11, wherein:
modulating the first delayed data and the pilot signal at the first frequency comprises modulating the first delayed data and the pilot signal with a first carrier at the first frequency; and
modulating the second delayed data and the pilot signal at the first frequency comprises modulating the second delayed data and the pilot signal with a second carrier at the first frequency;
wherein the first carrier and the second carrier are synchronized according to the common time reference.

13. An apparatus for transmitting media program information, comprising:
a master transmitter, for receiving channel coded data comprising the media program information, for generating a native signal having the channel coded data and native periodic synchronization information, the native signal for transmitting the media program information for reception by a remote receiver station disposed in a coverage area of a first secondary transmitter and a second secondary transmitter, the native periodic synchronization information having a time ambiguity with respect to a time reference common to a master transmitter, the first secondary transmitter, and the second secondary transmitter, for generating a first signal from the native signal, the first signal having the channel coded data and time ambiguity resolvable periodic synchronization information generated from the native periodic synchronization information, and for transmitting the first signal;
a first secondary transmitter, for receiving the first signal and for resolving the time ambiguity of the native periodic synchronization information according to the time ambiguity resolvable periodic synchronization information, and for transmitting a first retransmitted signal having the media program information;
a second secondary transmitter, for receiving the first signal and for resolving the time ambiguity of the native periodic synchronization information according to the time ambiguity resolvable periodic synchronization information, and for transmitting a second retransmitted signal having the media program information; and
wherein the first retransmitted signal is temporally offset from the second retransmitted signal by an amount determined at least in part according to the time ambiguity resolved periodic synchronization information and the common time reference.

14. The apparatus of claim 13, wherein the time ambiguity-resolvable periodic synchronization information is generated from the native periodic synchronization information at least in part by modifying the native periodic synchronization information.

15. The apparatus of claim 13, wherein the master transmitter modifies the native periodic synchronization information by generating a substitute symbol and substituting the generated symbol for a native symbol of the native periodic synchronization information.

16. The apparatus of claim 15, wherein the native symbol transmits no information between the master transmitter and the first secondary transmitter and the second secondary transmitter.

17. The apparatus of claim 15, wherein
the native signal comprises a plurality of frames, each having a respective portion of the native signal and the native periodic synchronization information; and
the substitute symbol is a counter, and the master transmitter generates the substitute signal at least in part by:
generating a counter;
substituting the generated counter for the native symbol of the native periodic synchronization information of a frame of the plurality of frames;
incrementing the counter; and
substituting the incremented counter for the native symbol of the native periodic synchronization information of a frame of the plurality of frames temporally following a preceding frame of the plurality of frames.

18. The apparatus of claim 15, wherein the first secondary transmitter substitutes the native symbol for the substitute symbol before transmitting the first retransmitted signal, and the second secondary transmitter substitutes the native symbol for the substitute symbol before transmitting the second retransmitted signal from the second secondary transmitter.

19. The apparatus of claim 14, wherein the native periodic synchronization information is modified to include a time stamp generated from the common time reference.

20. The apparatus of claim 13, wherein the native signal comprises an Advanced Television Systems Committee (ATSC) standard signal, and the native periodic synchronization information comprises field synchronization information.

21. The apparatus of claim 20, wherein the common time reference is a global time reference comprising a global positioning system (GPS) time reference.

22. The apparatus of claim 13, wherein:
the first secondary transmitter transmits the first retransmitted signal having the media program information at least in part by:
generating a first time delay for delaying the first retransmitted signal before transmission by the first secondary transmitter at least in part from a first synchronization time offset between the time ambiguity resolved periodic synchronization information received in the first secondary transmitter and the common time reference; and
transmitting the first retransmitted signal from the first secondary transmitter at a first frequency;
the second secondary transmitter transmits the second retransmitted signal having the media program information at least in part by:
generating a second time delay for delaying the second retransmitted signal before transmission by the second secondary transmitter at least in part from a second time synchronization offset between the time ambiguity resolved periodic synchronization information received in the first secondary transmitter and the common time reference; and
transmitting the second retransmitted signal from the second secondary transmitter at the first frequency.

23. The apparatus of claim 22, wherein the first retransmitted signal and the second retransmitted signal include a pilot signal and wherein:
the first secondary transmitter transmits the first retransmitted signal at the first frequency at least in part by:
delaying data received in the first secondary transmitter by the first time delay to generate first delayed data;
inserting the pilot signal into the first delayed data; and
modulating the first delayed data and the pilot signal at the first frequency;
the second secondary transmitter transmits the second retransmitted signal at the first frequency at least in part by:
delaying the data received in the second secondary transmitter by the second time delay to generate second delayed data;
inserting the pilot signal to the second delayed data; and
modulating the second delayed data and the pilot signal at the first frequency.

24. The apparatus of claim 23, wherein:
the first secondary transmitter modulates the first delayed data and the pilot signal at the first frequency at least in part by modulating the first delayed data and the pilot signal with a first carrier at the first frequency; and
the second secondary transmitter modulates the second delayed data and the pilot signal at the first frequency at least in part by modulating the second delayed data and the pilot signal with a second carrier at the first frequency;
wherein the first carrier and the second carrier are synchronized according to the common time reference.

* * * * *